United States Patent [19]

Tamaru et al.

[11] 4,223,338
[45] Sep. 16, 1980

[54] COLOR TELEVISION RECEIVER AND VTR SYSTEM

[75] Inventors: Hideshi Tamaru, Sagamihara; Katsuo Isono, Kawagoe; Seiji Sanada, Yokosuka; Kazuo Yamagiwa, Tokyo; Toshiyuki Yamauchi, Yokohama, all of Japan

[73] Assignee: Sony Corporation, Tokyo, Japan

[21] Appl. No.: 806,512

[22] Filed: Jun. 14, 1977

[30] Foreign Application Priority Data

Jun. 15, 1976 [JP] Japan .................................. 51-70250

[51] Int. Cl.² .......................... H04N 5/79; H04N 9/535
[52] U.S. Cl. .................................... 358/4; 358/27; 358/28; 358/21 V
[58] Field of Search ................. 358/4, 8, 27, 28, 21 V

[56] References Cited

U.S. PATENT DOCUMENTS

| | | | |
|---|---|---|---|
| 3,573,350 | 4/1971 | Rhee | 360/33 |
| 3,673,320 | 6/1972 | Carat et al. | 358/28 |
| 3,679,816 | 7/1972 | Avins et al. | 358/28 |
| 3,824,335 | 7/1974 | Hart | 360/33 |
| 3,950,780 | 4/1976 | Freestone | 358/28 |
| 3,969,755 | 7/1976 | Arimura et al. | 358/4 |
| 4,101,927 | 7/1978 | Isono et al. | 358/28 |

OTHER PUBLICATIONS

Wiencek, "Automatic Controls for Color Television", *Electronics*, May 15, 1959, pp. 58-59.
"GE's Broadcast-Controlled Color System, Part 1", *Electronic Technician/Dealer*, Aug. 1976, pp. 14-19.

*Primary Examiner*—John C. Martin
*Attorney, Agent, or Firm*—Lewis H. Eslinger; Alvin Sinderbrand

[57] ABSTRACT

In a color television system having a video tape recorder and a color television receiver which includes an automatic control circuit for automatically controlling color level and hue with a reference signal contained in a predetermined horizontal scanning line section of a video signal, and which is so designed that a broadcasting signal and a reproduced signal of the video tape recorder are selectively received by the color television receiver, the automatic control circuit rendered inoperative in response to a change-over operation by which the color television system is changed over to apply the reproduced signal of the video tape recorder to the color television receiver.

12 Claims, 16 Drawing Figures

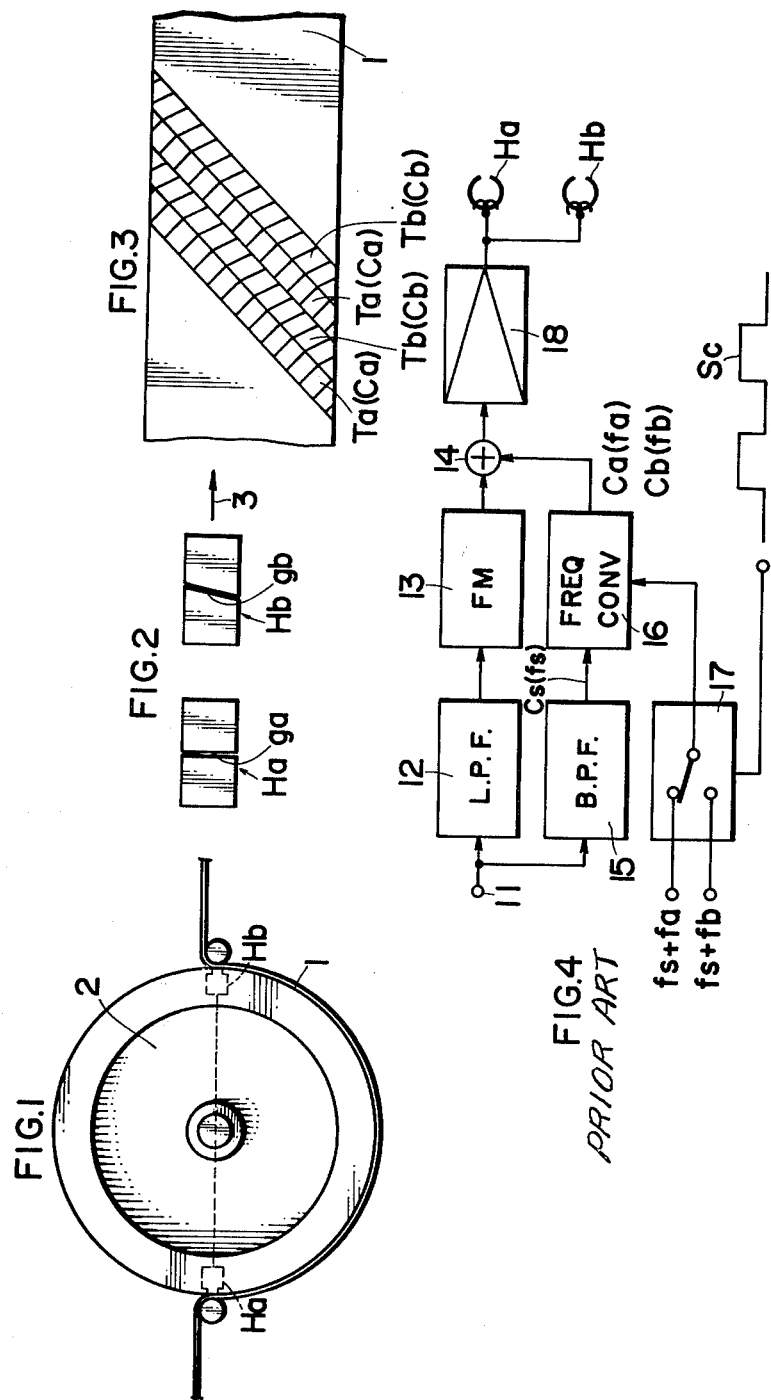

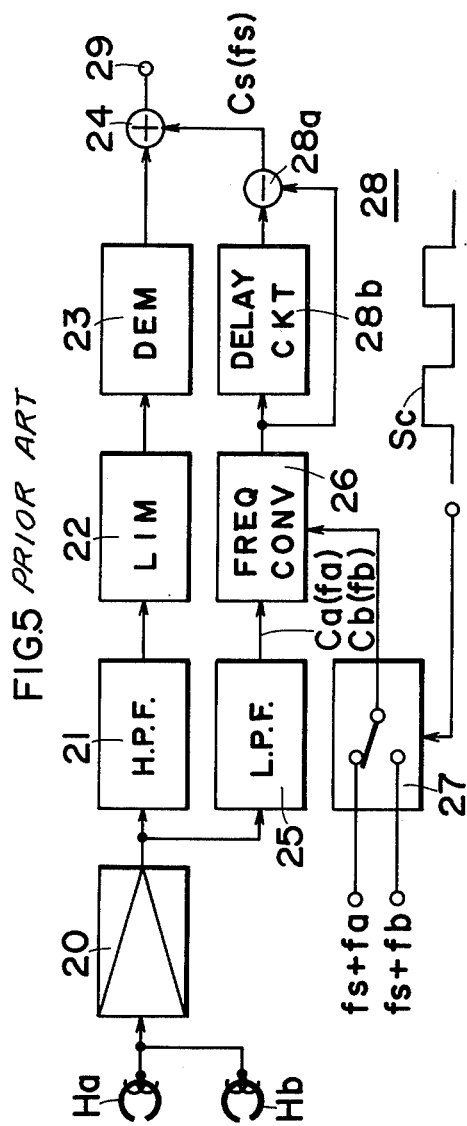

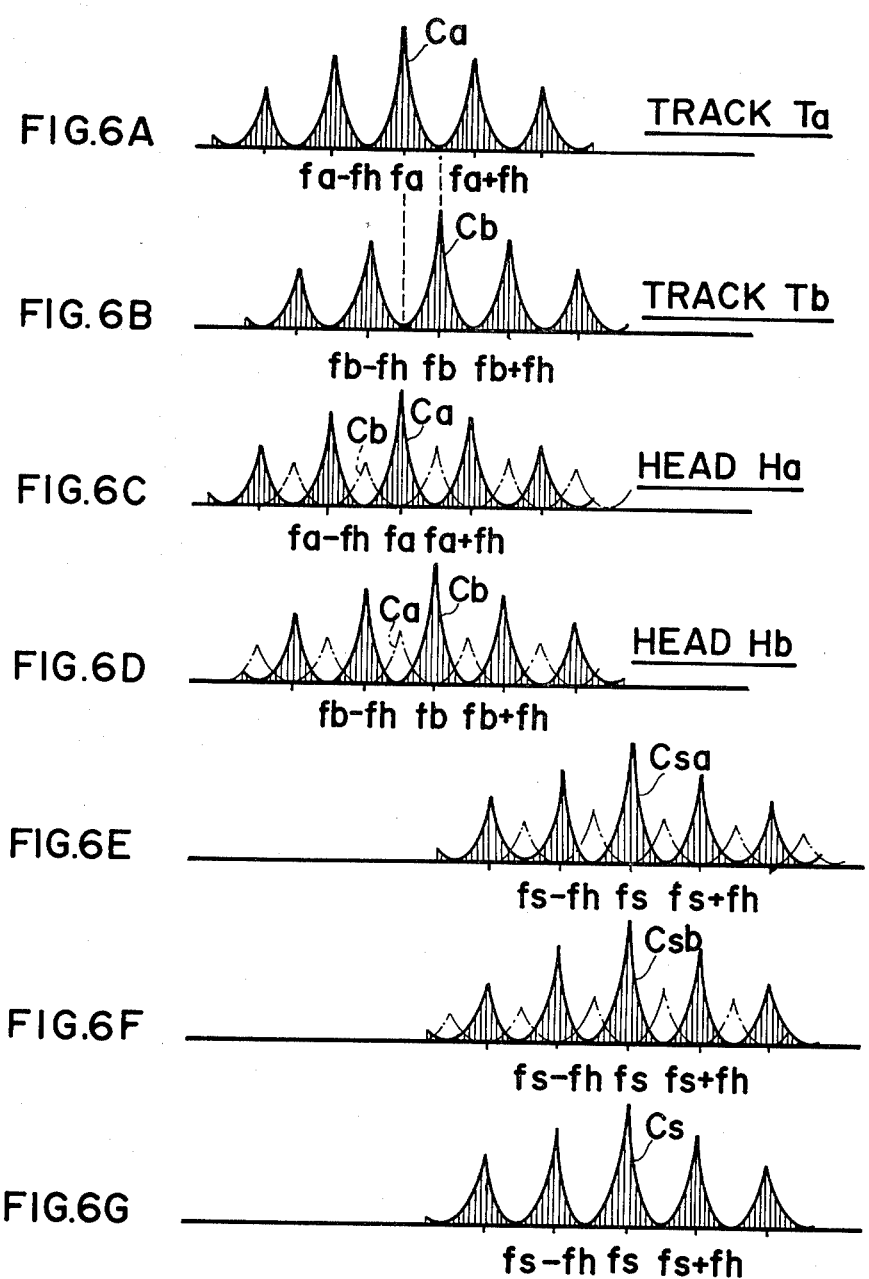

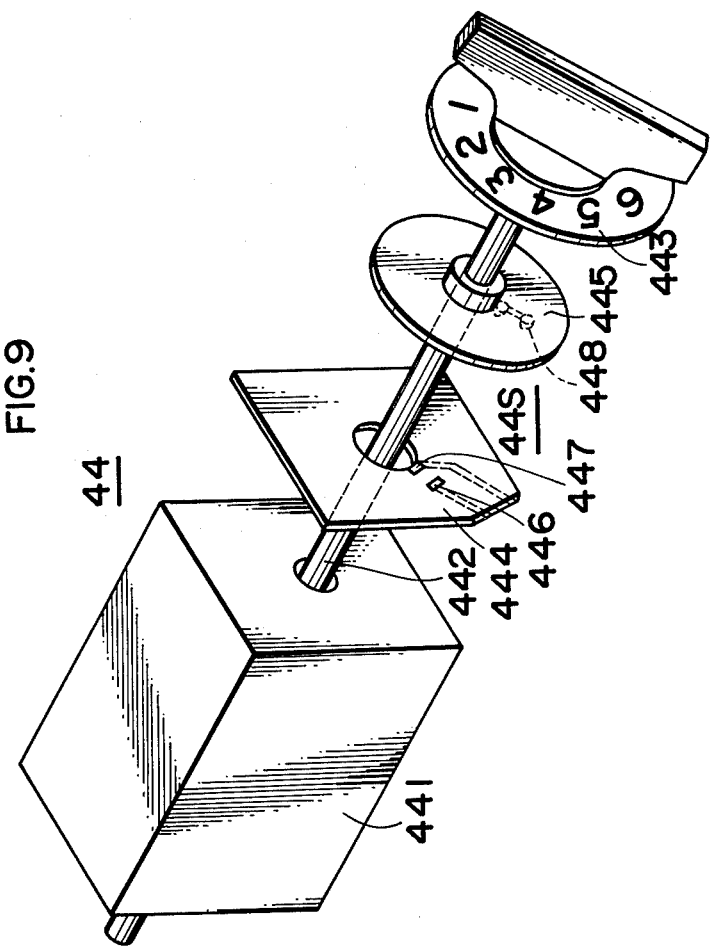

COLOR TELEVISION RECEIVER AND VTR SYSTEM

BACKGROUND OF THE INVENTION

1. Field of the Invention

This invention relates to a color television system including a video tape recorder (VTR) and a color television receiver, and more particularly to a color television system including a video tape recorder and a color television receiver which has an automatic control circuit for controlling color level and hue with a reference signal contained in a video signal.

2. Description of the Prior Art

For example, a color television system including a VTR and a color television receiver is known in which the reproduced signals of the VTR are modulated with a high frequency carrier signal for a specified idle television channel, for example, the second television channel in Tokyo, and the modulated signal are received by the color television receiver tuned to the second channel.

The following recording/reproducing method for increasing the recording density (record tracks per inch) is employed for the VTR of such a system:

As shown in FIG. 1, two rotary magnetic heads Ha and Hb are diametrically arranged in a tape guide drum 2. A magnetic tape 1 travels obliquely around a 180 degree portion of the tape guide drum 2, and during this travel around the tape guide drum 2, the magnetic tape 1 is contacted by the magnetic heads Ha and Hb. As shown in FIG. 2, gaps $g_a$ and $g_b$ of the magnetic heads Ha and Hb are different from each other in their inclination angle to the scanning direction shown by an arrow 3. The magnetic heads Ha and Hb rotate one revolution per one frame of video signals. In the recording, trace tracks Ta and Tb are alternately formed on the magnetic tape 1 by the magnetic heads Ha and Hb every field of the video signals, as shown in FIG. 3.

Referring to FIG. 4, in the recording operation, color video signals are applied through an input terminal 11 to a low pass filter 12 to obtain luminance signals. The luminance signals are applied to a frequency modulator 13. Thereby, modulated luminance signals having high frequency components within a recordable/reproducable frequency band are obtained, and applied to an adder 14.

The color video signals are applied also to a band pass filter 15. Chrominance signals whose subcarrier has a frequency fs, are obtained from the band pass filter 15, and applied to a frequency converter 16. Thereby, the frequency of the chrominance signals is converted to a low frequency.

An output of a switching circuit 17 is applied to the frequency converter 16. A signal having a frequency (fs+fa) is applied to one input terminal of the switching circuit 17, and another signal having a frequency (fs+fb) is applied to another input terminal of the switching circuit 17. The frequency (fs+fb) differs from the frequency (fs+fa) by half of a horizontal scanning frequency fh. The switching circuit 17 is changed over with a change-over signal Sc. In the fields when the magnetic head Ha contacts the magnetic tape 1, the switching circuit 17 is changed over to the signal of the frequency (fs+fa), as shown in FIG. 4, and the signal of the frequency (fs+fa) is applied to the frequency converter 16. And in the fields when the magnetic head Hb contacts the magnetic tape 1, the switching circuit 17 is changed over to the signal of the frequency (fs+fb), and the signal of the frequency (fs+fb) is applied to the frequency converter 16.

Accordingly, chrominance signals Ca in which the frequency of the subcarrier has been converted to a frequency fa, are obtained from the frequency converter 16 in the fields when the magnetic head Ha contacts the magnetic tape 1. And chrominance signals Cb in which the frequency of the subcarrier has been converted to a frequency fb, are obtained from the frequency converter 16 in the fields when the magnetic head Hb contacts the magnetic tape 1. The chrominance signals Ca and Cb are applied to the adder 14, and added to the modulated luminance signals thereby. The composite signals from the adder 14 are applied through an amplifier 18 to the magnetic head Ha and Hb. Thus, the chrominance signals Ca and Cb are recorded on the trace tracks Ta and Tb of the magnetic tape 1. As shown in FIG. 6A and FIG. 6B, the chrominance signals Ca and Cb are interleaved with each other in frequency components.

Referring to FIG. 5, in the reproducing operation, the signals from the magnetic heads Ha and Hb are applied through an amplifier 20 to a high pass filter 21. The modulated luminance signals are obtained from the high pass filter 21, and applied through a limiter 22 to a demodulator 23. The demodulated luminance signals from the demodulator 23 is applied to an adder 24.

When the magnetic head Ha scans not only the track Ta, but also a part of the adjacent track Tb, and when the magnetic head Hb scans not only the track Tb, but also a part of the adjacent track Ta, no cross-talk occurs, although so called "guard bands" are not formed between the adjacent tracks Ta and Tb in the recording operation. Because the modulated luminance signals are high frequency signals, luminance signals free of crosstalk are applied to the adder 24.

The reproduced signals from the magnetic heads Ha and Hb are applied through the amplifier 20 also to a low pass filter 25. The chrominance signals are obtained from the low pass filter 25. When the magnetic head Ha scans not only the track Ta, but also a part of the adjacent track Tb, the chrominance signals Cb interleaved with the chrominance signals Ca in frequency components are mixed as crosstalk components with the chrominance signals Ca in the chrominance signals from the filter 25, as shown in FIG. 6C, since guard bands are not formed between the adjacent tracks Ta and Tb in the recording operation. And when the magnetic head Hb scans not only the track Tb, but also a part of the adjacent track Ta, the chrominance signals Ca interleaved with the chrominance signals Cb in frequency components are mixed as crosstalk components with the chrominance signals Cb in the chrominance signals from the filter 25, as shown in FIG. 6D, since guard bands are not formed between the adjacent tracks Ta and Tb in the recording operation. The chrominance signals from the filter 25 are applied to a frequency converter 26. A switching circuit 27 is conneced to the frequency converter 26.

In the same manner as in the recording operation, the switching circuit 27 is changed over with a change-over signal Sc. In the fields when the magnetic head Ha contacts the magnetic tape 1, to reproduce the signals from the track Ta, the switching circuit 27 is changed over to the signal of the frequency (fs+fa), as shown in FIG. 5, and the signal of the frequency (fs+fa) is applied to the frequency converter 26. And in the fields when the magnetic head Hb contacts the magnetic tape 1 to reproduce the signals from the track Tb, the switching circuit 27 is changed over to the signal of the frequency (fs+fb), and the signal of the frequency (fs+fb) is applied to the frequency converter 26.

Accordingly, chrominance signals Csa in which the frequency of the subcarrier has been converted to the original frequency fs, are obtained from the frequency converter 26 in the fields when the magnetic head Ha contacts with the magnetic tape 1 to reproduce the signals from the track Ta, as shown in FIG. 6E. Crosstalk components interleaved with the chrominance signals Csa in frequency components are mixed with the chrominance signals Csa. And chrominance signals Csb in which the frequency of the subcarrier has been converted to the original frequency fs, are obtained from the frequency converter 26 in the fields when the magnetic head Hb contacts with the magnetic tape 1 to reproduce the signals from the track Tb, as shown in FIG. 6F. Crosstalk components interleaved with the chrominance signals Csb in frequency components are mixed with the chrominance signals Csb.

In order to remove the crosstalk components, the output signals of the frequency converter 26 are applied to a C-type comb line filter 28 which consists of a delay circuit 28b for delaying the output signals of the frequency converter 26 by a period of one horizontal scanning line, and a subtracter 28a. Thus, the original chrominance signals Cs without crosstalk component are obtained from the comb line filter 28, as shown in FIG. 6G, and applied to the adder 24 to be added to the luminance signals. The reproduced color video signals without crosstalk are obtained from an output terminal 29.

On the other hand, a VIR (vertical internal reference) signal for controlling hue and color level is contained in a color video signal transmitted from a broadcasting station. The VIR signal is contained in a 19-th horizontal scanning line section $T_{19}$ of every vertical scanning line section, in the color video signal. The VIR signal contains, as a chrominance reference portion, a sine wave having the frequency 3.58 MHZ of the subcarrier, and the same phase as a burst signal. FIG. 7A shows signals contained in 18-th and 19-th horizontal scanning line sections. Horizontal synchronizing signals are denoted by $P_H$, burst signals by Sb and the VIR signal by Sv. The burst signal Sb is at the black level, while the VIR signal Sv is at the color level corresponding to the standard brightness of the flesh color of human skin. Accordingly, when the chrominance signals are distorted in phase, the VIR signals Sb are similarly distorted in phase. The phase shifts of the VIR signals Sv from the burst signals Sb correspond to the phase distortions of the chrominance signals. Since the amplitudes of the VIR signals correspond to the levels of the chrominance signals, the former varies with the latter.

In the color television receiver, the VIR signals are picked up, from the 19-th horizontal scanning line section $T_{19}$ of every vertical scanning line section to control the color level and hue. Thus, undistorted chrominance signals are obtained and so undistorted color pictures are reproduced on the screen of the color television receiver.

When the color video signals are reproduced in the VTR having the comb line filter in the reproducing circuit, the signals in the 19-th horizontal scanning line section are mixed with the signals in the 18-th horizontal scanning line section. When color bar signals are contained in the 18-th horizontal scanning line section $T_{18}$, as shown in FIG. 7A, the VIR signals in the 19-th horizontal scanning line section $T_{19}$ are mixed with the color bar signals in the section $T_{18}$ by the comb line filter having the delay circuit for delaying the signals by the period of one horizontal scanning line section. Thus, the amplitude and phase of the VIR signals are distorted.

The signals contained in the horizontal scanning line section are added to the signals contained in the previous adjacent horizontal scanning line section, and the added signals are reduced to half in amplitude, by the comb line filter. When a pedestal level is maintained in the 18-th horizontal scanning line section $T_{18}$ as shown in FIG. 7B, the amplitude of the VIR signal picked up from the 19-th horizontal scanning line section $T_{19}$ is reduced to half by the comb line filter.

When the phase and level of the chrominance signals are controlled with the VIR signals thus distorted in phase and amplitude, in the color television receiver, the reproduced color picture is greatly distorted on the screen of the color television receiver. The desired color picture cannot be obtained.

SUMMARY OF THE INVENTION

Accordingly, it is an object of this invention to provide a color television system which overcomes the above described disadvantages of the conventional color television system.

Another object of this invention is to provide a color television system in which undistorted color pictures can be reproduced on the screen of a color television receiver from a video tape recorder.

In accordance with one aspect of this invention, a color television system has a video tape recorder and a color television receiver which includes an automatic control circuit for automatically controlling color level and/or hue with a reference signal contained in a predetermined horizontal scanning line section of a video signal, and is so designed that a broadcasting signal and a reproduced signal of the video tape recorder are selectively received by the color television receiver. The automatic control circuit is made inoperative in response to a changeover operation by which the color television system is changed over to apply the reproduced signal of the video tape recorder to the color television receiver.

The above and other objects, features and advantages of this invention, will be apparent in the following detailed description of an illustrative embodiment which is to be read in connection with the accompanying drawings.

BRIEF DESCRIPTION OF THE DRAWINGS

FIG. 1 is a schematic plan view of rotary magnetic heads and associated parts for explaining this invention;

FIG. 2 is a front view of the rotary magnetic heads of FIG. 1;

FIG. 3 is a plan view showing one example of trace tracks formed on a magnetic tape by the rotary magnetic heads of FIG. 1;

FIG. 4 is a block diagram of a recording circuit for a VTR applied to one embodiment of this invention;

FIG. 5 is a block diagram of a reproducing circuit for the VTR applied to one embodiment of this invention;

FIG. 6A to FIG. 6G are frequency spectra for explaining the block diagrams of FIG. 4 and FIG. 5;

FIG. 9 is a perspective view of a part of the system of FIG. 8.

DESCRIPTION OF THE PREFERRED EMBODIMENTS

One embodiment of a color television system according to this invention will be described with reference to FIG. 8 and FIG. 9.

Figure 7A:
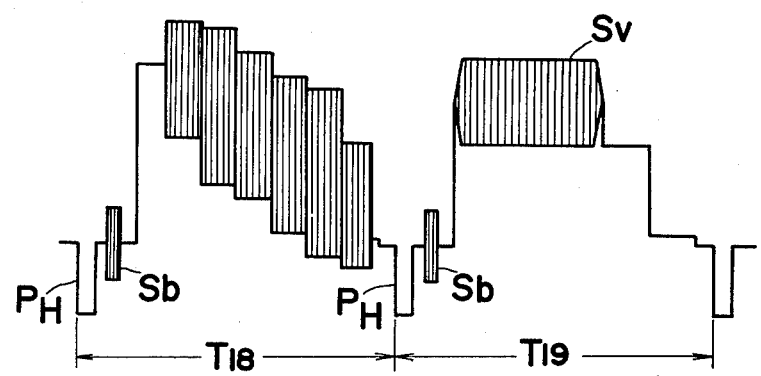
FIG. 7A and FIG. 7B are wave forms of video signals for explaining this invention.
Figure 7B:
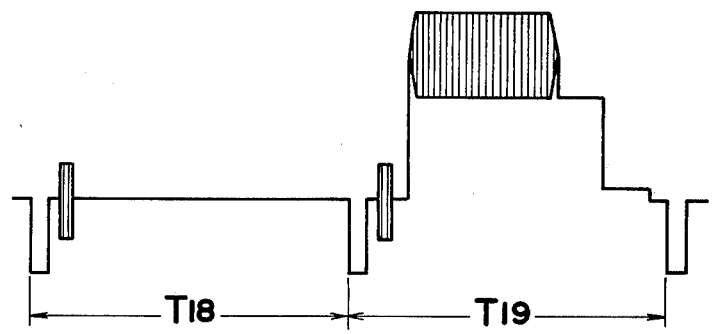
Figure 8:
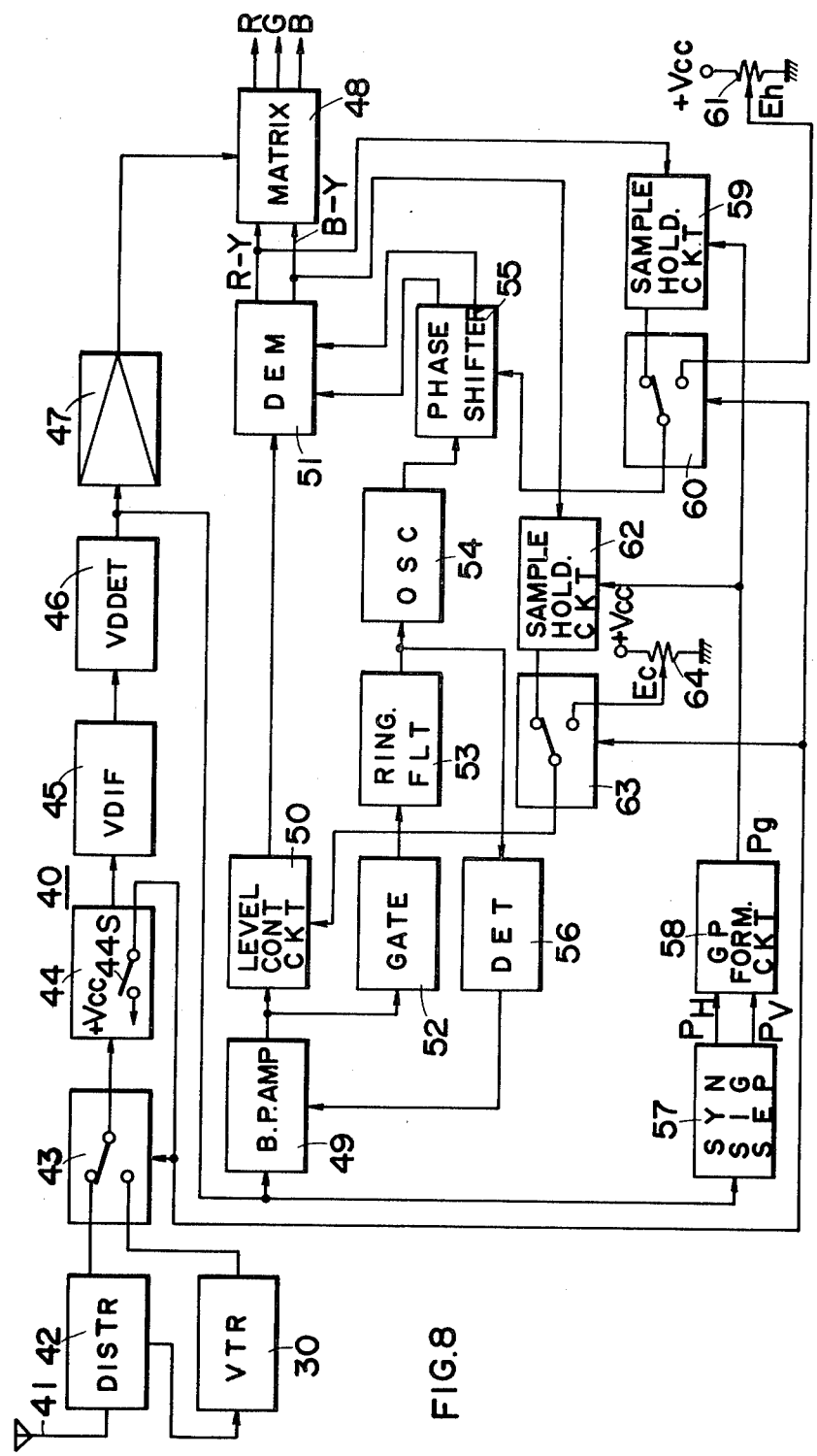
FIG. 8 is a block diagram of a color television system according to one embodiment of this invention.

In FIG. 8, a reference numeral 30 represents a video tape recorder (VTR), and a reference numeral 40 represents a color television receiver. Signals of desired broadcasting stations are recorded in the VTR 30. The VTR 30 contains a tuner and a high frequency modulator. The reproduced signals are modulated with a high frequency carrier for an idle channel, for example, the second channel of the color television receiver 40, and are transmitted to the television receiver 40.

Broadcasting waves are received by an antenna 41, and applied through a distributor 42 to an input terminal of a switching circuit 43. The modulated, reproduced signals of the VTR 30 are applied to another input terminal of the switching circuit 43. The broadcasting waves or the reproduced signals of the VTR 30 are supplied from the switching circuit 43 to a tunner 44 of the television receiver 40. The output of the tuner 44 is applied to a video IF amplifier 45, and then the output of the video IF amplifier 45 is applied to a video detector 46.

In this embodiment, a rotary tuner is used as the tuner 44, as shown in FIG. 9. A switch mechanism 44S is arranged in the rotary tunner 44. The switching circuit 43 is changed over with the switch mechanism 44S. When the tuner 44 is set to the second channel, the switch mechanism 44S is put in the ON-state.

Referring to FIG. 9, the rotary tuner 44 includes a tuner block 441, a tuner rotary shaft 442, a channel indicator 443 fixed to the top end of the tuner rotary shaft 442, and the switch mechanism 44S arranged between the tuner block 441 and the channel indicator 443. The switch mechanism 44S includes a base plate 444 loosely fitted to the rotary shaft 442 and a disc 445 rotated with the channel indicator 443. A pair of terminals 446 and 447 are fixed on the base plate 444. A short-circuit conductor 448 for short-circuitting the terminals 446 and 447 with each other is fixed on the disc 445. When the channel indicator 443 is rotated to the 2-channel position, the terminals 446 and 447 are short-circuited with each other by the short-circuit conductor 448 of the disc 445. The switch mechanism 44S is put into the ON-state.

When the tuner 44 is set to any other position than the 2-channel position, the switch mechanism 44S is put in the OFF-state, and the switching circuit 43 is changed over as shown in FIG. 8. So, the broadcasting signals received by the antenna 41 are applied through the switching circuit 43 to the tuner 44. When the tuner 44 is set to the 2-channel position, the switch mechanism 44S is put in the ON-state, and so a DC voltage +Vcc is supplied through the terminals 446 and 447 to the switching circuit 43. The switching circuit 43 is changed over to the reproduced signals of the VTR 30. The reproduced signals converted to high frequency signals are applied to the tuner 44.

The video signals from the video detector 46 are applied to a video amplifier 47. Luminance signals are applied to a video amplifier 47. Luminance signals are applied from the video amplifier 47 to a matrix circuit 48.

The output of the video detector 46 is applied also to a band pass amplifier 49. The chrominance signals from the band pass amplifier 49 are applied through a color level control circuit 50 to a demodulator 51, and applied also to a burst signal gate circuit 52. The burst signals from the gate circuit 52 are applied to a ringing filter 53. Continuous ringing signals are obtained from the ringing filter 53, and applied to an oscillator 54. Oscillation signals from the oscillator 54 are applied to a phase shifter 55. The output of the phase shifter 55 is applied to the demodulator 51, as demodulating signals for R-Y axis and B-Y axis.

Red color difference signals (R-Y) and blue color difference signals (B-Y) are obtained from the demodulator 51, and applied to the matrix circuit 48. Red, green and blue chrominance components R, G and B are obtained from the matrix circuit 48, and supplied to a color cathode ray tube.

The continuous ringing signals from the ringing filter 53 are applied also to a detector 56. The amplitudes of the continuous ringing signals are detected there. The detecting output of the detector 56 is applied to the band pass amplifier 49 to control the levels of the chrominance signals.

On the other hand, the output signals of the video detector 46 are supplied to a synchronizing signal separator 57. Horizontal synchronizing signals $P_H$ and vertical synchronizing signals $P_V$ are obtained from the synchronizing signal separator 57, and applied to a gate pulse forming circuit 58. A gate pulse Pg as "1" is obtained from the gate pulse forming circuit 58 in the 19-th horizontal scanning line section of every vertical scanning line section which contains the VIR signal Sv.

The gate pulse Pg is supplied to a sample holding circuit 59. A demodulation voltage for R-Y axis, obtained from the demodulator 51, is sampled by the sample holding circuit 59 in the horizontal scanning line section containing the VIR signal, and held for the time of one vertical scanning line section by the sample holding circuit 59. The held demodulation voltage is applied to one input terminal of a switching circuit 60. A DC voltage Eh obtained from a movable contact of a variable resistor 61 is applied to another terminal of the switching circuit 60. The output voltage of the switching circuit 60 is supplied to the phase shifter 55. The shifting amount of the phase shifter 55 is controlled with the output voltage of the switching circuit 60.

The gate pulse Pg is supplied also to another sample holding circuit 62. A demodulation voltage for B-Y axis, obtained from the demodulator 51, is sampled by the sample holding circuit 62 in the horizontal scanning line section containing the VIR signal, and held for the time of one vertical scanning line section by the sample holding circuit 62. The held demodulation voltage is applied to one input terminal of a switching circuit 63. A DC voltage Ec obtained from a movable contact of a variable resistor 64 is applied to another terminal of the switching circuit 63. The output voltage of the switching circuit 63 is supplied to the color level control circuit 50. The level of the chrominance signal to be applied to the demodulator 51 is controlled with the output voltage of the switching circuit 63.

The switching actions of the switching circuit 60 and 63 are controlled with the switch mechanism 44s arranged in the tuner 44, in the same manner as the switching action of the above described switching circuit 43. When the tuner 44 is set to any other channel position than the 2-channel position, the switching circuits 60 and 63 are changed over as shown in FIG. 8. And when the tuner 44 is set to the 2-channel position, the switching circuits 60 and 63 are connected to the DC voltages Eh and Ec, respectively.

When the tuner 44 of the television receiver is changed over to any other channel position than the 2-channel position, for example, to a 1-channel position, to receive broadcasting signals, the switch mechanism 44s is put in the OFF-state, and the switching circuits 43, 60 and 63 are changed over as shown in FIG. 8. The held demodulation voltages for R-Y axis and B-Y axis, sampled by the sample holding circuits 59 and 62 in the horizontal scanning line section containing the VIR signal, are supplied through the switching circuit 60 and 63 to the phase shifter 55 and the color level control circuit 50. Thus, the phase and level of the chrominance signal are automatically controlled. Undistorted color picture are formed on the screen of the television receiver 40.

When the tuner 44 of the television receiver 40 is changed over to the 2-channel position to receive the reproduced signals from the VTR 30, the switch mechanism 44s of the tuner 44 is put in the ON-state. The switching circuits 43, 60 and 63 are connected to the other input terminals. The DC voltages Eh and Ec obtained from the movable contacts of the variable resistors 61 and 64 are applied through the switching circuits 60 and 63 to the phase shifter 55 and the color level control circuit 50 to control the hue and color level.

As above described, when the reproduced signals of the VTR 30 are received by the television receiver 40, the automatic control circuit in the television receiver 40 becomes inoperative, that is the latter does not function with the VIR signal. The desired color pictures are reproduced on the screen of the television receiver 40 with the manual adjustment of the variable resistors 61 and 64.

According to this invention, since the color television system is so designed that the circuits to automatically control the hue and color level with the VIR signal do not function when the reproduced signals of the VTR are received by the television receiver, the hue and color level are not controlled with VIR signal distorted in phase and amplitude which is contained in the 19-th horizontal scanning line section $T_{19}$ of the reproduced video signals of the VTR. The undistorted color pictures are reproduced on the screen of the television receiver with the predetermined hue and color level.

Although the above embodiment is applied to the VTR including the comb line filter in the reproducing circuits, this invention may be applied to a VTR including the comb line filter in the recording circuits.

In a VTR which does not include the comb line filter in the reproducing system and in the recording system, but includes an APC circuit or AFC circuit to obtain signals for frequency conversion with reference to burst signals picked up from the input video signals, the VIR signals do not always correspond to the chrominance signals in phase, when the APC circuit or AFC circuit is not superior in response characteristics. In that case, when the nue and color level are automatically controlled with the VIR signal contained in the reproduced signals of the VTR, the color picture is distorted. This invention may be applied to such a case.

In the above embodiment, the reproduced signals of the VTR are received by the idle channel of the color television receiver. However, this invention may be applied to a color television system which can be changed over to selectively receive the reproduced signals of the VTR without high frequency modulation, and the video detection output of the color television receiver by a change-over switch. In that case, when the color television system is changed over to receive the reproduced signals of the VTR with the switching action of the change-over switch, the automatic control circuit with the VIR signal is made insperative in response to the switching action of the change-over switch.

Of course, a reference signal for controlling hue and color level is not limitted to the above described VIR signal.

While there has been described preferred embodiment of the invention, obviously further modifications and variations are possible in light of the above teachings. It is therefore to be understood that within the scope of the appended claims, the invention may be practised otherwise than as specifically described.

What is claimed is:

1. A color television system comprising a video tape recorder, a color television receiver which includes an automatic control circuit for automatically controlling color level and/or hue with a reference signal contained in a predetermined horizontal scanning line section of a video signal, selective means for selectively applying a broadcasting signal and a reproduced signal of said video tape recorder to said color television receiver, and means rendering said automatic control circuit inoperative in response to a change-over operation of said selective means by which said color television system is changed over to apply the reproduced signal of said video tape recorder to said color television receiver.

2. A color television system according to claim 1, in which said color television receiver includes a chrominance demodulator and said automatic control circuit includes a first holding circuit for holding for a predetermined time a demodulation voltage for a first chrominance demodulation axis, sampled from said chrominance demodulator at the time of said horizontal scanning line section containing said reference signal; a phase shifter for supplying demodulating signals for said first chrominance demodulation axis and a second chrominance demodulation axis to said chrominance demodulator; and a first switching circuit for applying said demodulation voltage held by said first holding circuit, as a phase control voltage, to said phase shifter; said first switching circuit being rendered unable to apply said demodulation voltage held by said first holding circuit in response to a changeover operation by which said color television system is changed over to supply the reproduced signal of said video tape recorder to said color television receiver.

3. A color television system according to claim 1, in which said color television receiver includes a tuner, and the reproduced signal of said video tape recorder is modulated with a carrier having a frequency for an idle channel of said color television receiver, and the modulated, reproduced signal is applied to said tuner when said color television system is changed over to supply the reproduced signal of said video tape recorder to said color television receiver.

4. A color television system according to claim 1, in which said reference signal is contained in said predetermined horizontal scanning line section during every vertical blanking interval, having predetermined time and level, the frequency of subcarrier and the same phase as a burst signal.

5. A color television system according to claim 1, in which said color television receiver includes a chrominance demodulator and said automatic control circuit includes a second holding circuit for holding for a predetermined time a demodulation voltage for a second chrominance demodulation axis sampled from said chrominance demodulator at the time of said horizontal scanning line section containing said reference signal; a color level control circuit for applying chrominance signals to said chrominance demodulator; and a second switching circuit for applying said demodulation voltage held by said second holding circuit as a color level voltage to said color level control circuit, said second switching circuit being rendered unable to apply said demodulation voltage held by said second holding circuit in response to a change over operation by which said color television system is changed over to supply the reproduced signal of said video tape recorder to said color television.

6. A color television system according to claim 1, in which said color television receiver includes a chrominance demodulator and said automatic control circuit includes a first holding circuit for holding for a predetermined time a demodulation voltage for a first chrominance demodulation axis, sampled from said chrominance demodulator at the time of said horizontal scanning line section containing said reference signal; a phase shifter for supplying demodulating signals for said first chrominance demodulation axis and a second chrominance demodulation axis to said chrominance demodulator; and a first switching circuit for applying said demodulation voltage held by said first holding circuit as a phase control voltage to said phase shifter; a second holding circuit for holding for a predetermined time a demodulation voltage for said second chrominance demodulation axis, sampled from said chrominance demodulator at the time of said horizontal scanning line section containing said reference signal; a color level control circuit for applying chrominance signals to said chrominance demodulator; and a second switching circuit for applying said demodulation voltage held by said second holding circuit as a color level control voltage to said color level control circuit; at least one of said first and second switching circuits being rendered unable to apply said demodulation voltage held by the respective one of said first and second holding circuits in response to a changeover operation by which said color television system is changed over to supply the reproduced signal of said video tape recorder to said color television receiver.

7. A color television system according to claim 6, in which said color television receiver includes a video signal input terminal and the reproduced signal of said video tape recorder is supplied through said video signal input terminal to said color television receiver, and said reproduced signal of said video tape recorder and a detected broadcast video signal are selectively received in said color television receiver, at least one of said first and second switching circuit being changed over in accordance with the selection of said reproduced signal of said video tape recorder and said detected broadcast video signal.

8. A color television system according to claim 6, in which said color television receiver includes a tuner and the reproduced signal of said video tape recorder is modulated with a carrier having a frequency for an idle channel of said color television receiver, and the modulated, reproduced signal is applied to said color television system is changed over to supply the reproduced signal of said video tape recorder to said color television receiver.

9. A color television system according to claim 6, further including manually adjustable DC voltage source means, and in which said phase control voltage and color level control voltage are obtained from said DC voltage source means so as to provide manual control of phase and color level whenever said color television system is changed over to apply the reproduced signal of said video tape recorder to said color television receiver.

10. A color television system comprising a video recorder, a color television receiver which includes a tuner having a channel selecting member, an automatic control circuit for automatically controlling color level and/or hue with reference signal contained in a predetermined horizontal scanning line section of a video signal, selective means for selectively applying a broadcasting signal and a reproduced signal of said video tape recorder to said color television receiver, and means rendering said automatic control circuit inoperative in response to a change-over operation of said selective means by which the reproduced signal of said video tape recorder is applied to said color television receiver; the reproduced signal of said video tape recorder being modulated with a carrier having a frequency for an idle channel of said color television receiver, and the modulated, reproduced signal being applied to said tuner when said color television system is changed over to supply the reproduced signal of said video tape recorder to said color television receiver; and wherein said color television receiver includes a switching circuit, and said means rendering said automatic control circuit inoperative includes a short-circuit element fixed on said channel selecting member, and two terminal elements, and said modulated, reproduced signal of said video tape recorder is applied through said switching circuit to said tuner when said channel selecting member is set to a position for said idle channel to short-circuit said two terminal elements with each other through said short-circuit element.

11. A color television system comprising a video tape recorder providing a reproduced video signal; a color television receiver including a tuner having a channel selecting member, a chrominance demodulator, selective means for selectively applying a broadcasting signal and a reproduced signal of said video tape recorder to the tuner of said color television receiver, and an automatic control circuit for automatically controlling color level and/or hue with a reference signal contained in a predetermined horizontal scanning line section of a video signal, said automatic control circuit including a first holding circuit for holding for a predetermined time a demodulation voltage for a first chrominance demodulation axis sampled from said chrominance demodulator at the time of said horizontal scanning line section containing said reference signal, a phase shifter for supplying demodulating signals for said first chrominance demodulation axis and a second chrominance demodulation axis to said chrominance demodulator, a first switching circuit for applying said demodulation voltage held by said first holding circuit as a phase control voltage to said phase shifter, a second holding circuit for holding for a predetermined time a demodulation voltage for said second chrominance demodulation axis sampled from said chrominance demodulator at the time of said horizontal scanning line section containing said reference signal, a color level control circuit for applying chrominance signals to said chrominance demodulator, and a second switching circuit for applying said demodulation voltage held by said second holding circuit as a color level control voltage to said color level control circuit; in which said selective means includes a third switching circuit, said reproduced signal of said video tape recorder is modulated with a carrier having a frequency for an idle channel of said color television receiver, and the modulated, reproduced signal of the video tape recorder is applied through said third switching circuit to said tuner when said channel selecting member is set to a position for said idle channel; the system further comprising means rendering said automatic control circuit inoperative in response to a change-over operation of said selective means by which the reproduced signal of said video tape recorder is applied to said color television receiver, the last-mentioned means including a short circuit element fixed on said channel selecting member and two terminal elements, said two terminal elements being short circuited with each other through said short-circuit element when said channel selecting member is set to a position for said idle channel, thereby rendering at least one of said first and second switching circuits unable to apply said demodulation voltage held by the respective one of said first and second holding circuits in response to the selection of said idle channel.

12. A color television system according to claim 11, in which at least one of said first and second switching circuits is rendered unable to apply said demodulation voltage held by the respective one of said first and second holding circuits, when said channel selecting member is set to the position for said idle channel to short-circuit said two terminal elements with each other through said short-circuit element.

* * * * *